(12) United States Patent
Sasaki

(10) Patent No.: US 9,845,630 B2
(45) Date of Patent: Dec. 19, 2017

(54) POWER-DOOR OPENING AND CLOSING DEVICE AND AUTOMOBILE PROVIDED WITH OPENING AND CLOSING DEVICE

(71) Applicant: Mitsui Kinzoku Act Corporation, Yokohama-shi, Kanagawa (JP)

(72) Inventor: Kazuyuki Sasaki, Yokohama (JP)

(73) Assignee: Mitsui Kinzoku Act Corporation, Kanagawa (JP)

( * ) Notice: Subject to any disclaimer, the term of this patent is extended or adjusted under 35 U.S.C. 154(b) by 0 days.

(21) Appl. No.: 15/314,499

(22) PCT Filed: Dec. 9, 2014

(86) PCT No.: PCT/JP2014/082593
§ 371 (c)(1),
(2) Date: Nov. 28, 2016

(87) PCT Pub. No.: WO2016/006141
PCT Pub. Date: Jan. 14, 2016

(65) Prior Publication Data
US 2017/0198515 A1    Jul. 13, 2017

(30) Foreign Application Priority Data
Jul. 10, 2014  (JP) .................................. 2014-142075

(51) Int. Cl.
*F16H 1/28*  (2006.01)
*E05F 15/611*  (2015.01)
(Continued)

(52) U.S. Cl.
CPC ............ *E05F 15/611* (2015.01); *B60J 5/106* (2013.01); *F16H 1/28* (2013.01); *F16H 21/40* (2013.01); *E05Y 2900/546* (2013.01)

(58) Field of Classification Search
CPC ........................................................ F16H 1/28
See application file for complete search history.

(56) References Cited

U.S. PATENT DOCUMENTS

2014/0373454 A1* 12/2014 Sasaki ................... E05F 15/63
49/350

FOREIGN PATENT DOCUMENTS

| JP | 5-31040 Y2 | 8/1993 |
|---|---|---|
| JP | 2005-082019 A | 3/2005 |

(Continued)

OTHER PUBLICATIONS

International Search Report and Written Opinion of the International Searching Authority, dated Mar. 3, 2015, for corresponding International Application No. PCT/JP2014/082593, 7 pages.

*Primary Examiner* — Derek D Knight
(74) *Attorney, Agent, or Firm* — Klarquist Sparkman, LLP

(57) ABSTRACT

A power door opening device comprises a casing; a motor mounted to the casing; a planetary gear unit housed in the casing to reduce rotation speed of the motor; and an output mechanism that transmits reduced rotation from the planetary gear unit to a door to open and close the door. The planetary gear unit comprises a sun gear that rotates with a rotary shaft of the motor; a planetary carrier fixed in the casing; a planetary gear that is rotatably supported to the planetary carrier and meshes with the sun gear; and a ring gear that is rotatably supported in the casing and meshes with the planetary gear. Both ends of the sun gear are supported.

4 Claims, 9 Drawing Sheets

(51) Int. Cl.
     *F16H 21/40*         (2006.01)
     *B60J 5/10*          (2006.01)

(56) References Cited

FOREIGN PATENT DOCUMENTS

| | | |
|---|---|---|
| JP | 4195665 B2 | 8/2005 |
| JP | 2009-185583 A | 8/2009 |
| JP | 2014-105486 A | 6/2014 |

\* cited by examiner

FIG. 10

| POSITION | T(FROM MIRROR) | B(FROM OB) | H(FROM ROOF) | DIRECTION OF MIKE |
|---|---|---|---|---|
| P1 | 600 | 0 | 200 | FORWARD OF VEHICLE |
| P2 | 1450 | 0 | 200 | ↑ |
| P3 | 1750 | 300 | 330 | UPWARD |
| P4 | 1600 [mm] FROM GROUND AND 100 [mm] FROM DOOR | | | FORWARD OF VEHICLE |

FIG. 11

| POSITION | EMBODIMENTS | | COMPANY1 | | COMPANY2 | |
|---|---|---|---|---|---|---|
| | NOISE(db) | | NOISE(db) | | NOISE(db) | |
| | Open | Close | Open | Close | Open | Close |
| P1 | 46.3 | 45.2 | 53.0 | 50.6 | 49.3 | 49.3 |
| P2 | 50.4 | 49.7 | 54.6 | 52.9 | 54.7 | 54.2 |
| P3 | 51.6 | 50.9 | 56.3 | 52.6 | 58.8 | 57.2 |
| P4 | 42.5 | 41.4 | 49 | 46.5 | 49.4 | 48.4 |

POWER-DOOR OPENING AND CLOSING DEVICE AND AUTOMOBILE PROVIDED WITH OPENING AND CLOSING DEVICE

CROSS-REFERENCE TO RELATED APPLICATIONS

The present application is the U.S. National Stage of International Application No. PCT/JP2014/082593, filed Dec. 9, 2014, which claims the benefit of and priority to Japanese Patent Application No. 2014-142075, filed Jul. 10, 2014.

BACKGROUND OF THE INVENTION

The present invention relates to a power door opening device for opening and closing a door with a motor and a motor vehicle with the device.

A conventional power door device comprises a motor; a reduction mechanism for slowing down the motor; an output member for opening and closing a door by transmitting reduced rotation from the reduction mechanism to the door; and a clutch mechanism for transmitting torque of the motor to the output member when it operates and cutting off the transmitting of the rotating force from the motor to the output member in JP2005-82019A.

However, the conventional power door device with the clutch mechanism is large. Thus, a position for attaching it in a motor vehicle is limited, and it is necessary to change the attached position in the motor vehicle, thereby decreasing capability for mounting it in the motor vehicle.

As disclosed in JP2014-105486A, the applicant proposed a power door opening device that comprises a first-step reduction mechanism or a cycloid reduction mechanism for slowing down rotation of the motor; a second-step reduction mechanism or a planetary gear mechanism for further slowing down rotation supplied from the first reduction mechanism; a third-step reduction mechanism for further slowing down rotation supplied from the second-step reduction mechanism; and an output member for transmitting a drive force supplied from the third-step reduction mechanism, the reduction mechanisms being arranged in series in a cylindrical case to enable the whole device to be smaller.

However, in order to supply high-quality motor vehicles in recent years, it is necessary to provide a motor vehicle with a power door opening device to reduce operating noise when a door is opened and closed by power of a motor.

SUMMARY OF THE INVENTION

In view of the disadvantage, it is an object of the present invention to provide a power door opening device with quietness and a motor vehicle with the device.

BRIEF DESCRIPTION OF THE DRAWINGS

FIG. 10 is a table showing measuring points.

FIG. 11 is a table of operating noise at the measuring points.

DETAILED DESCRIPTION OF PREFERRED EMBODIMENTS

One embodiment of the present invention will be described with respect to the drawings.

Figure 1:
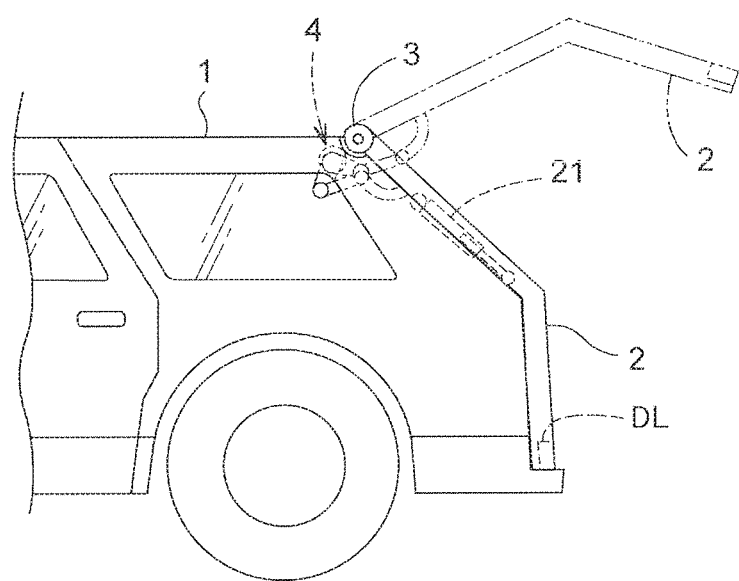
FIG. 1 is a side elevational view of a rear part of a vehicle to which the present invention is applied.

FIG. 1 illustrates a side elevational view of a rear part of a vehicle with a power door opening device according to the present invention.

A liftgate 2 is supported at the top of the rear part of a vehicle body 1 with a pair of door hinges 3 to open and close. A door latch device DL in the middle of a lower part engages with a striker (not shown) and can move between a fully-closed position in which a back opening of the vehicle body 1 is closed as shown by solid lines in FIG. 1 and a fully-open position in which the rear end is jumped up so that the back opening is open, as shown by two dotted lines in FIG. 1.

Between the vehicle body 1 and the liftgate 2, there is provided a gas spring 21 in which one end is pivotally connected to the vehicle body 1 and the other end is pivotally connected to the liftgate 2. The liftgate 2 is forced by the gas spring 21 in an opening direction to reduce a drive force when the liftgate 2 is electrically opened and a force when the liftgate 2 is manually opened.

At the upper part of the back opening of the vehicle body 1 under a roof, there is provided a power door opening device 4 for opening and closing the liftgate 2 electrically.

Figure 2:
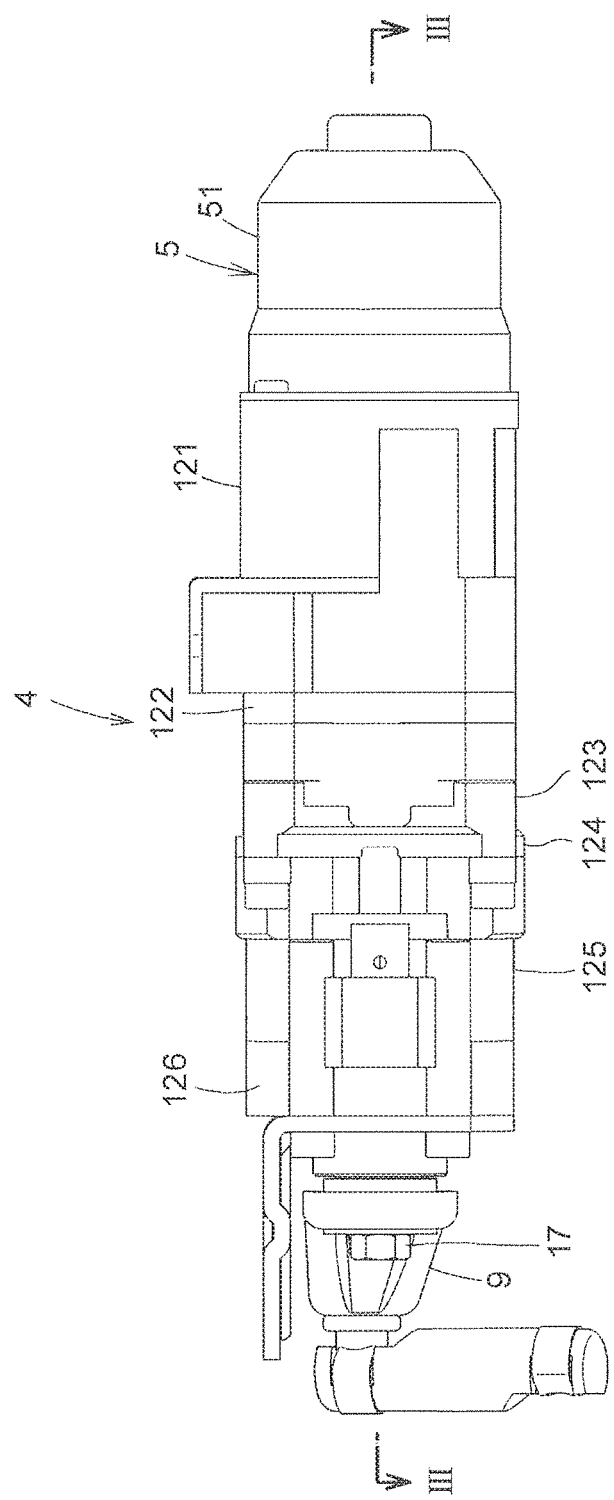
FIG. 2 is a front elevational view of a power door opening device.
Figure 3:
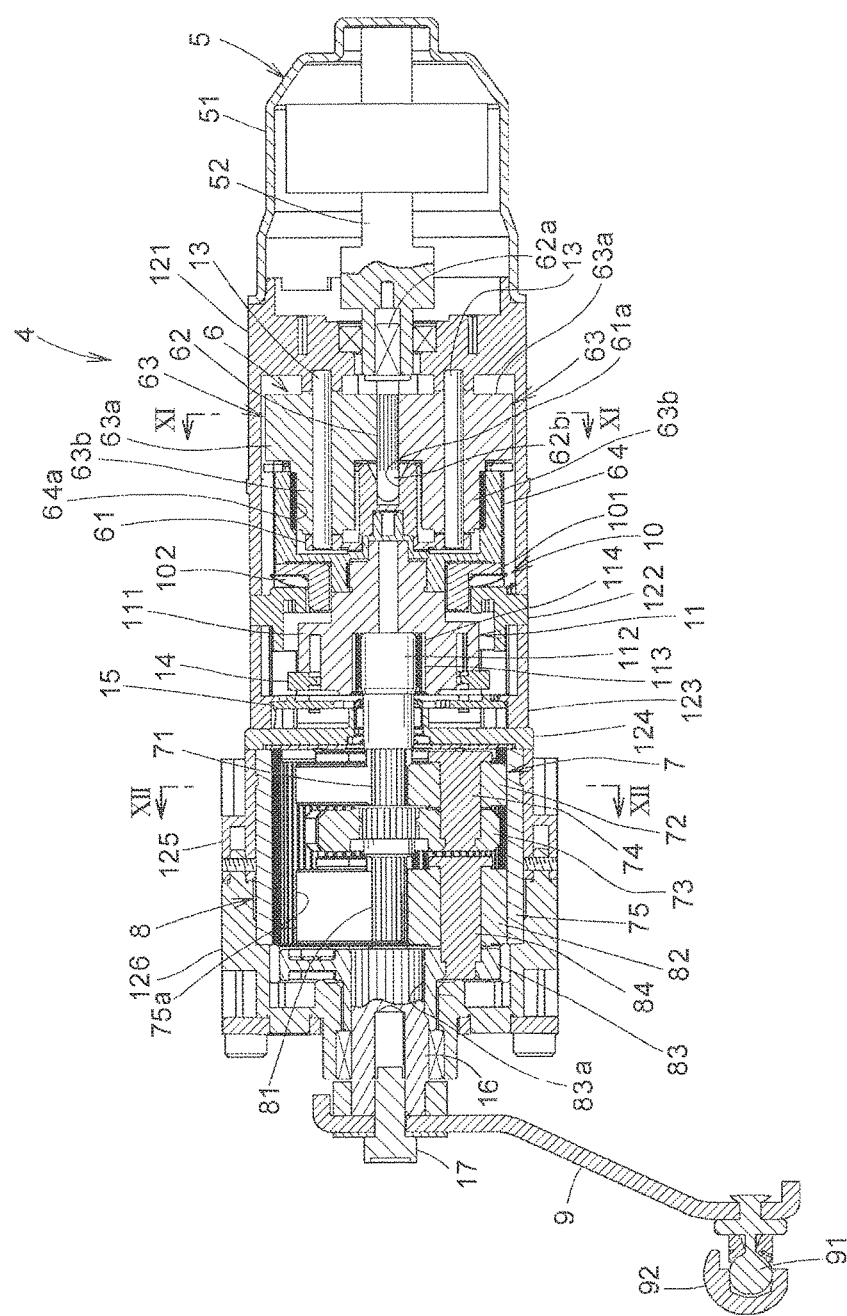
FIG. 3 is a sectional view taken along the line III-III in FIG. 2.
Figure 4:
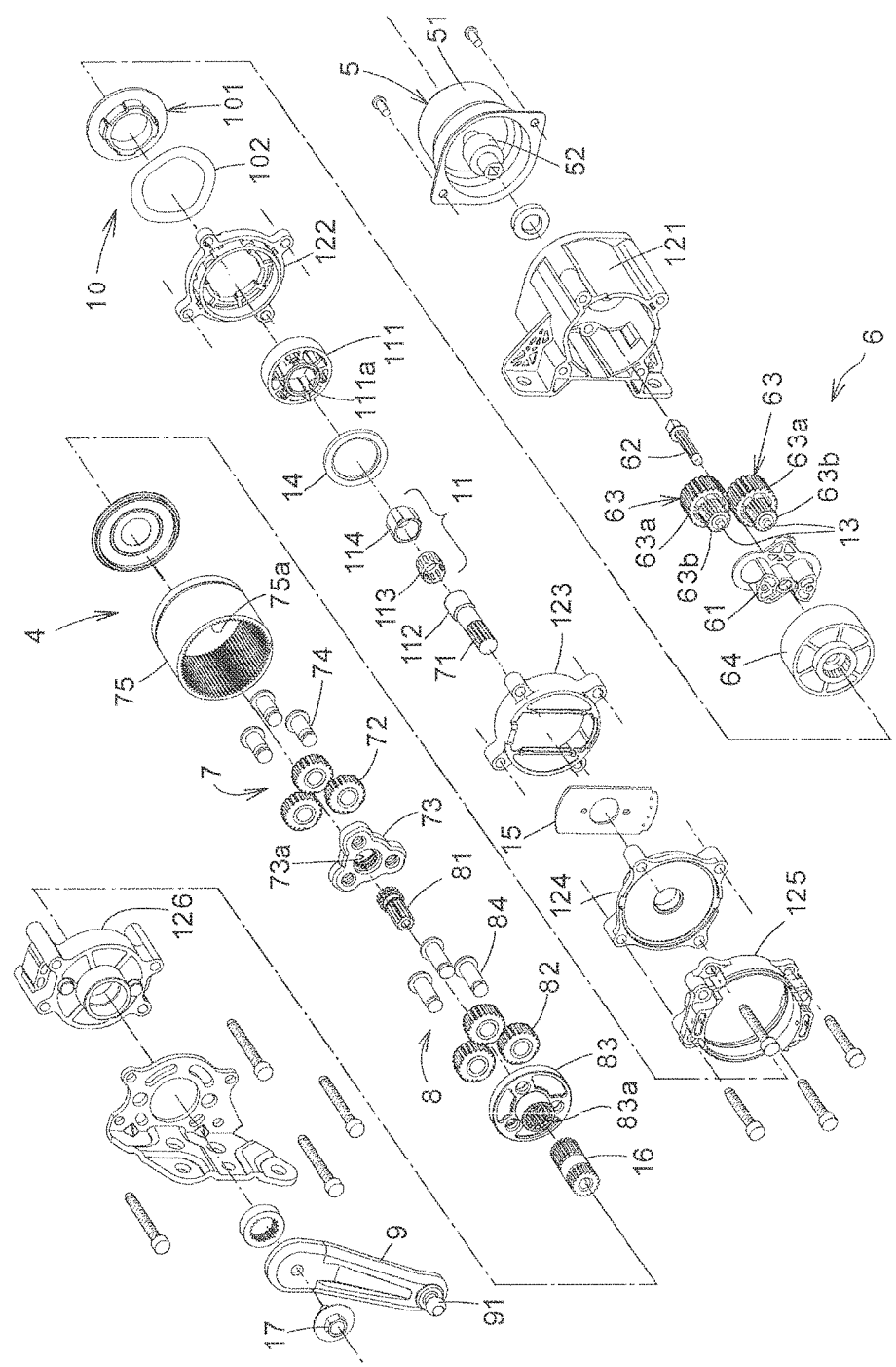
FIG. 4 is an exploded perspective view of the power door opening device.

In FIGS. 2 to 4, the power door opening device 4 is clutchless, is approximately cylindrical as a whole, is horizontally long and comprises a motor 5; a first planetary gear unit 6 that slows down the motor 2 as the first step; a second planetary gear unit 7 that further slows down rotation supplied from the first planetary gear unit 6 as the second step; a third planetary gear unit 8 that further slows down rotation supplied from the second planetary gear unit 7 as the third step; an output arm 9 that comprises an output mechanism for transmitting rotation from the third planetary gear unit 8 to the liftgate 2; a brake mechanism 10 that applies a braking force that enables the liftgate 2 to be held in an optional intermediate open position; a torque limiter mechanism 11 that can transmit a predetermined torque; and a cylindrical casing 12 that houses each element so that the device 4 is attached to the vehicle body 1 along a width of the vehicle.

The casing 12 comprises a gear case 121; a spring-retaining case 122; an intermediate case 123; a sensor cover 124 and gear cases 125, 126 each of which is divided and later described, but is not limited thereto. If it is cylindrical as a whole, any measures for dividing the casing 12 are possible.

The motor 5 is controlled with PWM control by a control (not shown) equipped in the vehicle body.

The first planetary gear unit 6 comprises a planetary gear 61 fixed not to be rotatable in a gear case 121 fixed to a motor case 61; a sun gear 62 connected to a rotary shaft 52 of the motor 5 not to be rotatable relative to each other; two planetary gears 63 that mesh with the sun gear 62; and a ring gear 64 in which the planetary gear 64 meshes with internal teeth 64a on an inner circumferential surface.

The planetary gear 63 comprises a larger-diameter gear 63a that meshes with the sun gear 62 and a smaller-diameter gear 63b that meshes with the internal teeth 64a of the ring gear 64. The planetary gear 63 is rotatably mounted via a support shaft 13 one end of which is supported in a planetary carrier 61 and the other end is supported in the gear case 121.

In the first planetary gear unit 6, the sun gear 62 rotates with rotation of the rotary shaft 52 of the motor 5 and the planetary gear 63 rotates on its own axis around the support shaft 13. The ring gear 64 that meshes with the smaller-diameter gear 63b of the planetary gear 63 rotates around an axis of the motor 5 and reduces speed.

The brake mechanism 10 comprises a friction plate 101 that is supported not to rotate but to slide axially in the cylindrical spring-retaining case 122 fixed to the gear case 121; and a wave washier 102 held under compression between the spring-retaining case 122 and the friction plate 101.

The friction plate 10 is pressingly fitted on the left side of the ring gear 64 by elastic repulsive force of the wave washier 102 with a predetermined frictional force. The wave washier 102 applies a predetermined resistant force to rotation of the ring gear 64 and holds the liftgate 2 in an intermediate open position with a predetermined brake force.

The torque limiter mechanism 11 comprises a synthetic-resin output rotary member 111 coupled relative not to rotate the ring gear 64 of the first planetary gear unit 6 with the brake mechanism 10; a metal intermediate output shaft 112 that can transmit torque of the output rotary member 111 to the second planetary gear unit 7; a collar 114 that is fitted in an axial hole 111a of the output rotary member 111 not to rotate to each other; and a cylindrical tolerance ring 113 that is fitted on the intermediate output shaft 112 and pressingly fitted into the axial hole 111a of the output rotary member 111 with the collar 114. When rotation load or torque greater than frictional force between the tolerance ring 113 and the collar 114 is supplied into the intermediate output shaft 112, sliding is generated at contact portions, and the intermediate rotary member 111 rotates relative to the intermediate output shaft 112, so that torque of the ring gear 64 of the first planetary gear unit 6 cannot be transmitted to the intermediate output shaft 112.

A ring-like magnetic rotary sensor 14 is fixed to the left side of the output rotary member 111. The magnetic rotary sensor 14 can detect an open position and opening velocity of the liftgate 2 with a sensor substrate 15 later described.

The sensor substrate 15 has a sensor (not shown) such as hall elements for detecting rotation of the magnetic rotary sensor 14 and is fixed between the intermediate case 123 fixed to the left side of the spring-retaining case 122 and the sensor cover 124 fixed to the left side of the intermediate case 123.

The second planetary gear unit 7 further reduces rotation speed supplied from the first planetary gear unit 6 via the torque limiter mechanism 11 and comprises a sun gear 71 formed with the intermediate output shaft 112 of the torque limiter mechanism 11; three planetary gears 72 that mesh with the sun gear 71; a planetary carrier 73 for pivotally mounting the planetary gear 72 via a shaft 74 in parallel with an axis of the motor 5; and a ring gear 75 in which internal teeth 75a that mesh with the planetary gear 72 are formed on the inner circumferential surface.

The third planetary gear unit 8 further reduces rotation speed given from the second planetary gear unit 7, and comprises a sun gear 81 fitted in and fixed to a central hole 73a of the planetary carrier 73, three planetary gears 82 that mesh with the sun gear 81, a planetary carrier 83 for pivotally mounting the planetary gear 82 via a shaft 84 in parallel with an axis of the motor 5, and a ring gear 75 used for the second planetary gear unit 7.

The second planetary gear unit 7 and the third planetary gear unit 8 are housed in a cylindrical gear case 125 fixed to the left side of the sensor cover 124 and a bottomed gear case 126 fixed to the left side of the gear case 125.

The sun gear 71 rotates with the ring gear 64 of the first planetary gear unit 6, and the planetary gear 72 rotates on its own axis while the planetary gears 72 mesh with the sun gear 71 and the internal teeth 75a of the ring gear 75. The second planetary gear unit 7 revolves around the axis of the motor 5. The planetary carrier 73 rotates with reduction in speed based on the revolution of the planetary gear 72, and the rotation is transmitted to the sun gear 81 of the third planetary gear unit 8.

When the sun gear 81 rotates, the planetary gears 82 mesh with the sun gear 81 and the internal teeth 75a of the ring gear 75 and rotates on its own axis, so that the third planetary gear unit 8 revolves around the axis of the motor 5. Thus, the planetary carrier 8 rotates with reduction in speed owing to revolution of the planetary gear 82.

Reduced rotation of the planetary carrier 8 is transmitted to the output shaft 16 fitted in the central hole 83a of the planetary carrier 83 and to the output arm 9 with a bolt 17 fixed to the end of the output shaft 16 projecting from the gear case 126. Rotation of the output arm 9 is transmitted to the liftgate 2 via a spherical joint portion 91 at the free end of the output arm 9 and a connecting arm 92 connected to the spherical joint portion 91. Thus, the liftgate 2 opens and closes vertically around an axis of the door hinge 3.

Then, a motion of the power door opening device 4 in the foregoing embodiment will be described.

When the liftgate 2 is in a closed or an open position, the motor 5 starts, and the rotation of the rotary shaft 52 of the motor 5 is supplied to the sun gear 62 of the first planetary gear unit 6 and given from the ring gear 64 via the planetary gears 63 that mesh with the sun gear 62. With rotation of the ring gear 64, the friction plate 101 that is in contact with the left side of the ring gear 64 slides, so that the ring gear 64 can still rotate.

Torque given from the ring gear 64 of the first planetary gear unit 6 is transmitted to the sun gear 71 of the second planetary gear unit 7 via the torque limiter mechanism 11. The output rotary member 111 of the torque limiter mechanism 11 is in contact with the intermediate output shaft 112 with a frictional force of the tolerance ring 113. Torque of the ring gear 64 is transmitted without problem to the sun gear 71 of the second planetary gear unit 7 via the intermediate output shaft 112.

Torque of the sun gear 71 of the second planetary gear unit 7 is transmitted with further reduction in speed to the sun gear 81 of the third planetary gear unit 8 via the planetary gear 72 and the planetary carrier 73. Torque transmitted to the third sun gear 81 is transmitted with reduction in speed to the planetary carrier 83 via the planetary gear 82. Torque transmitted to the planetary carrier 83 is transmitted to the output arm 9 via the output shaft 16. Thus, the output arm 9 rotates through a predetermined angle around the axis of the motor 5, thereby opening or closing the liftgate 2 via the connecting arm 92 coupled to the output arm 9.

When the motor 5 stops at an intermediate open position between the fully-closed position and the fully-open position, the liftgate 2 can be held in the intermediate open position by a braking force of the brake mechanism.

While the liftgate 2 is being opened or closed by the power of the motor, the liftgate 2 comes in contact with an obstacle and a great external force exerts on the liftgate 2 in an opening direction or in a closing direction. Then, the torque limiter mechanism 11 is actuated. Specifically, if excessive load beyond driving force of the motor 5 is applied to the liftgate 2 in an opening/closing direction, slip torque is applied between the tolerance ring 113 and the output rotary member 111 of the torque limiter mechanism 11, and the output rotary member 111 rotates relative to the intermediate output shaft 112, so that torque of the first planetary gear unit 6 cannot be transmitted to the second planetary gear unit 7. Thus, excessive load is not applied to the motor 5 and to each of the planetary gears 6 to 8 thereby preventing the motor 5 and each of the gears from being broken.

When the liftgate 2 is opened and closed manually, the motor 5 is started by detecting starting of the liftgate 2, and the liftgate 2 can be opened and closed by assistant force of the motor 5. In this case, in PWM control for controlling the motor 5, the faster manual opening/closing speed of the liftgate 2, the greater the duty ratio gets, and the slower the speed is, the smaller the duty ratio gets. Thus, assistant force corresponding to manual opening/closing speed of the liftgate 2 can be applied, assistant control that provides high followability can be performed, so that the liftgate 2 can be operated naturally, quietly and manually. In order to detect starting motion of the liftgate 2, an angular velocity sensor may be provided at the end of the liftgate 2.

(Improvements)

In this embodiment, in order to reduce operating noise of the power door opening device when the liftgate 2 is opened and closed, the following improvements can be taken:

(A) The sun gear 62 of the first planetary gear unit 6 comprises a both-end support structure that prevents axial runout of the sun gear 62 when the sun gear 62 rotates thereby securing engagement of the sun gear 62 and the planetary gear 63 and improving quietness of operating noise.

Figure 5:
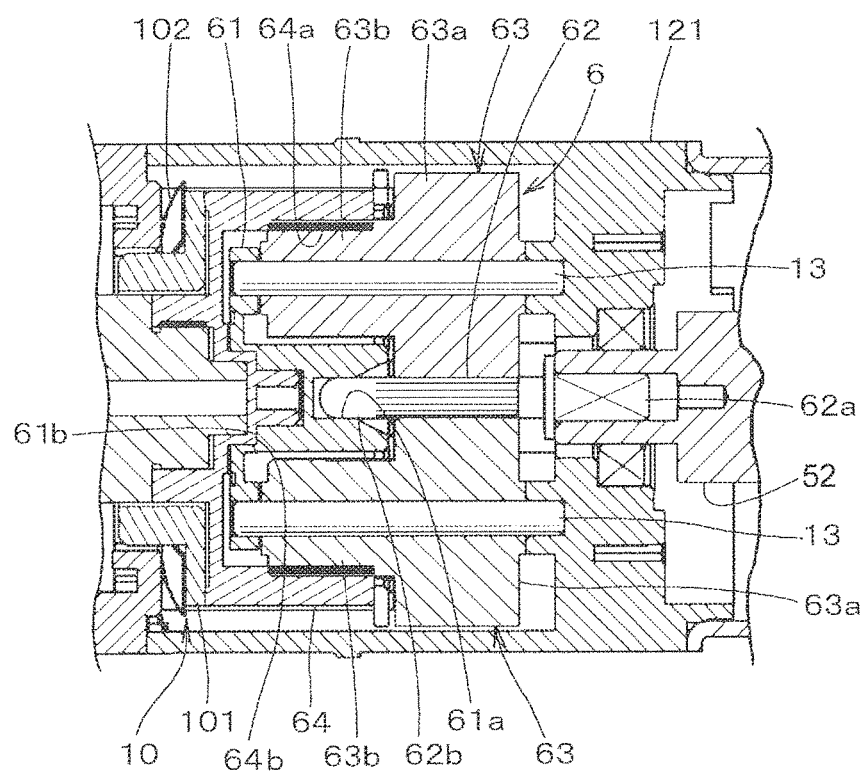
FIG. 5 is an enlarged sectional view of a main part.
Figure 6:
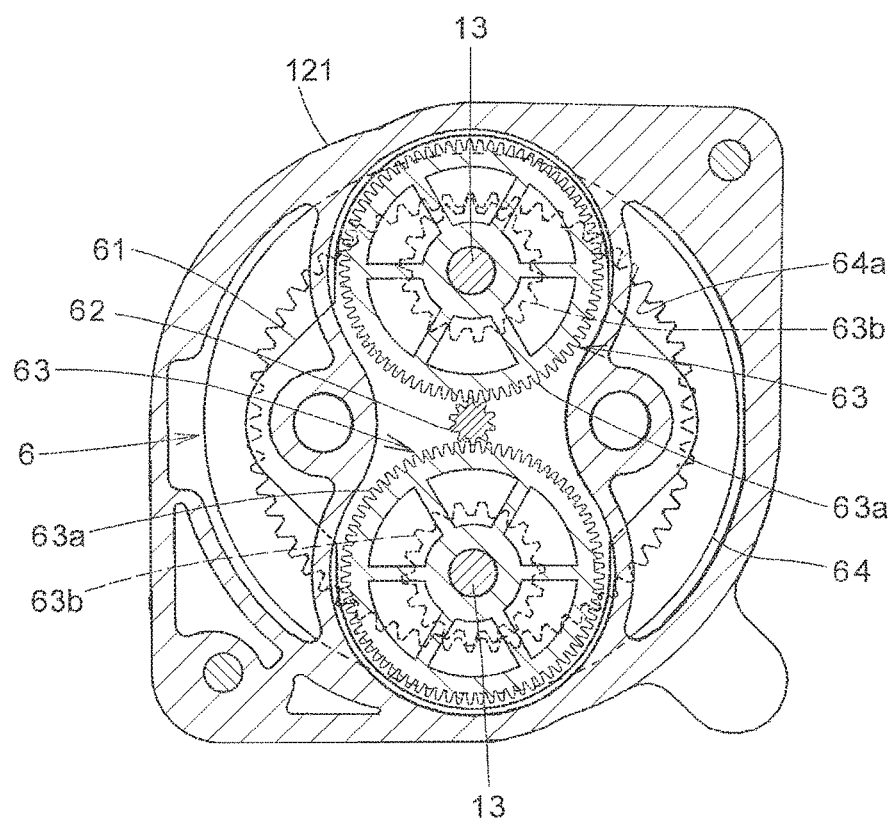
FIG. 6 is an enlarged sectional view taken along the line VI-VI in FIG. 3.
Figure 7:
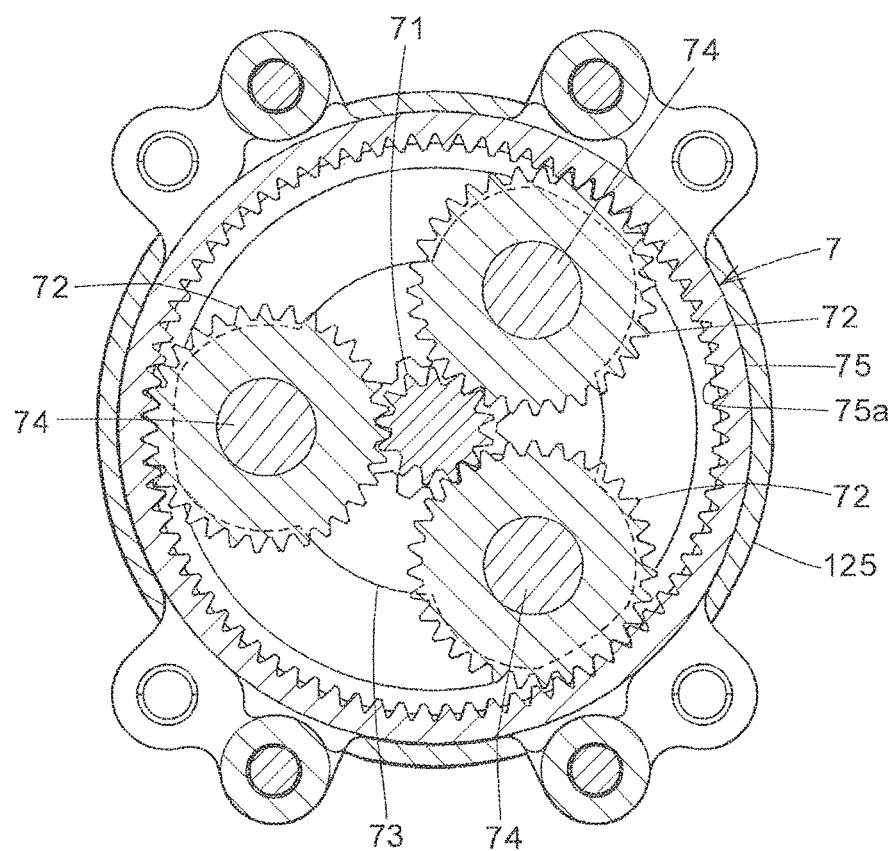
FIG. 7 is an enlarged sectional view taken along the line VII-VII in FIG. 3.

As shown in FIGS. 3 and 5, one end 62a of the sun gear 62 fits in the end of the rotary shaft 52 of the motor 5 not to rotate from each other, and the other end 62b rotatably puts into a central hole 61a of the planetary carrier 61 fixed in the gear case 121 to construct the both-end support structure of the sun gear 62.

(B) In FIG. 5, part 64b of the ring gear 64 of the first planetary gear unit 64 is axially contacted with a bottom 61b of the planetary carrier 61 fixed in the gear case 121 to prevent axial runout when the ring gear 64 rotates, thereby securing engagement of the planetary gear 63 with the ring gear 64 and improving quietness of operating noise.

(C) The planetary gear 63 and the smaller-diameter gear 63b of the first planetary gear unit 6 and the internal teeth 64a of the ring gear 64 that meshes with the smaller-diameter gear 63b have a module that ranges from 0.5 to 0.7. Most preferably, the module is 0.6 that improves front-face engagement rate and prevents generation of vibrating sound due to rotation vibration of the ring gear 64 thereby improving quietness of operating noise.

(D) The sun gear 71 of the second planetary gear unit 7 and the planetary gear 72 that meshes with the sun gear 71 have a module that ranges from 0.5 to 0.7. Most preferably, the module is 0.6 that improves front-face engagement rate and prevents generation of vibrating sound thereby improving quietness of operating noise.

The module in (C) and (D) is based on the Japanese Industrial Standards (JIS B1701-2, Cylindrical gears for general engineering and for heavyengineering—Part 2: Module).

(E) On the way of the motion-transmitting path for transmitting rotation of the motor 5 to the liftgate 2, the torque limiter mechanism 11 is provided thereby preventing each tooth from being damaged.

Besides the improvements (A) to (E), the following measures (F) and (G) are taken thereby improving quietness.

(F) The modules of the sun gear 62 of the first planetary gear unit 6 and the larger-diameter gear 63a of the planetary gear 63 that meshes with the sun gear 62 differ from the modules of the internal teeth 64a of the ring gear 64 and the smaller-diameter gear 63b of the planetary gear 63 that meshes with the internal teeth 64a. Thus, the frequency and phase of the vibration generated from the first planetary gear unit 6 differ thereby enabling noise from resonace to be reduced.

(G) Taking account of a mounting position of the power door opening device 4 to the vehicle, PWM frequency of the motor 5 is formely determined or is variable to prevent resonance.

Then, operating noise is described when the liftgate 2 is opened and closed by the power-door opening device 4 to which the improvements (A) to (G) are applied All the improvements (A) to (E) are not indispensable, but at least one measure of (A) to (D) may be taken, improving quietness of operating noise compared with the prior art.

Figure 8:
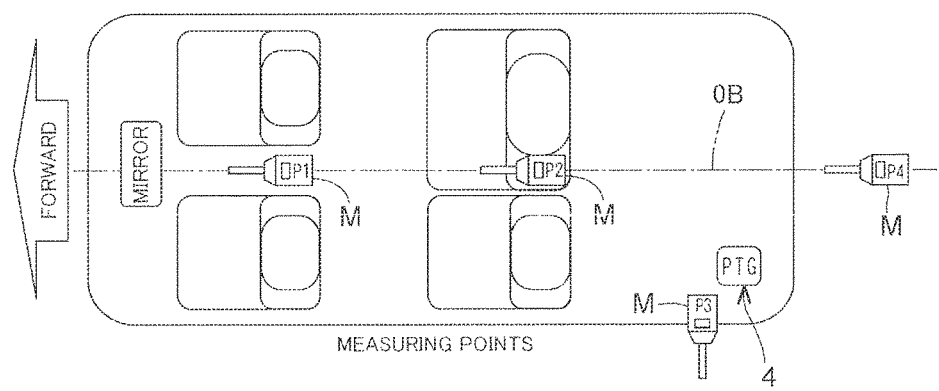
FIG. 8 is a schematic view of the vehicle to show how to measure operating noise in the power door opening device.
Figure 9:
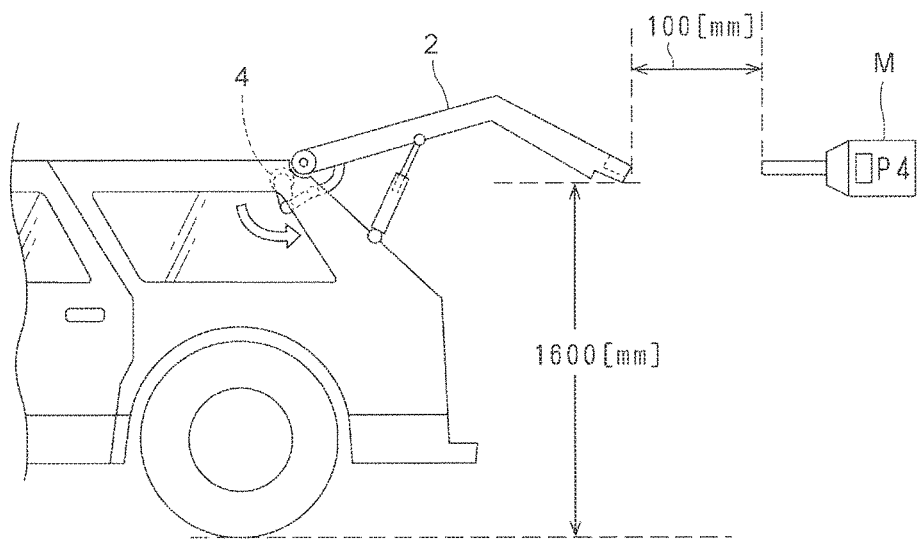
FIG. 9 is a side elevational view of the rear part of the vehicle to show how to measure operating noise in the power door opening device.

Data of operating noise from the power door opening device 4 in FIG. 11 results from experiments carried out under the conditions in FIGS. 8 to 10.

Measuring equipment M (Kabushiki Kaisha Ono Sokki, Broadband sound level meter LA-5111) is disposed at measuring points P1, P2, P3, P4, and the motor 5 of the power-door opening device 4 is activated at voltage of 11.8-12 V. Data of operating noise is shown.

In FIGS. 8 and 10, the measuring point P1 is disposed between right and left front seats in the vehicle at a distance of 600 mm from a mirror, 0 mm from 0 B and 200 mm from a roof; the measuring point P2 is disposed in the middle of rear seats at a distance of 1450 mm from the mirror, 0 mm from 0 B and 200 mm from the roof; the measuring point P3 is disposed in a luggage room at a distance of 1750 mm from the mirror, 300 mm from 0 B and 330 mm from the roof; and the measuring point P4 is disposed outside the vehicle at a distance of 1600 mm from the ground and 100 mm backward from the end of the liftgate 2 when the liftgate 2 is fully open.

A microphone is directed forward of the vehicle at the points P1, P2 and P4 and upward at the point P3.

Operating noise in the foregoing conditions is 46.3 db at the point P1 when the liftgate 2 is being opened by the power door opening device 4 and 45.2 db when being closed; 50.4 db at the point P2 when being opened and 49.7 db when being closed; 51.6 db at the point P3 when being opened and 50.6 db and 50.9 db; and 42.5 db at the point P4 when being opened and 41.4 db when being closed. Operating noise measured in the vehicle ranges from 46.3 to 51.6 db.

For information, a benchmark test in the power door opening device is described below.

In FIG. 11, in a power door opening device of another company with a planetary gear as a reduction mechanism without the improvements (A) to (D), noise is 53.0 db at the point P1 when being opened and 50.6 db when being closed;

54.6 db at the point P2 when being opened and 52.9 db when being closed; 56.3 db at the point P3 when being opened; and 52.6 db when being closed: 49.0 db at the point P4 when being opened and 46.5 db when being closed. In a power door opening device of still another company with a spindle as a reduction mechanism, it is 49.3 db at the point P1 when being opened and 49.3 db when being closed; 54.7 db at the point P2 when being opened and 54.2 db when being closed; 58.8 db at the point P3 when being opened and 57.2 db when being closed; and 49.4 db at the point P4 when being opened and 48.4 db when being closed.

The results also prove that the power door opening device in the embodiment reduces operating noise to improve quietness.

The foregoing relates to an embodiment of the invention, and various changes and modifications may be made without departing from the gist of the invention as below:
(i) Instead of the liftgate, a door is a side door that opens and closes around a vertical shaft or a sliding door that slides to open and close longitudinally of the vehicle.
(ii) Instead of three-step reduction means with the first, second and third planetary gears 5, 6, 7, two or more than three step reduction means may be used.

What is claimed is:
1. A clutchless power door opening device comprising:
a casing;
a motor mounted to the casing;
a planetary gear unit housed in the casing to reduce rotation speed of the motor; and
an output mechanism that transmits reduced rotation from the planetary gear to the door to open and close the door,
wherein the planetary gear unit comprises a sun gear that rotates with a rotary shaft of the motor, a planetary carrier fixed in the casing, a planetary gear that is rototably supported to the planetary carrier and meshes with the sun gear, and a ring gear that is rotatably supported in the casing and meshes with the planetary gear,
wherein one end of the sun gear fits in the rotary shaft of the motor so that the sun gear rotates together with the rotary shaft of the motor and the other end is supported to rotate in the planetary carrier whereby the sun gear is supported at both ends.

2. The clutchless power door opening device of claim 1 wherein modules of the planetary gear and the ring gear of the planetary gear unit are about 0.6.

3. A motor vehicle in which the clutchless power door opening device of claim 1 is mounted at a rear part of a vehicle body,
wherein operating noise measured in a vehicle ranges from 46.3 to 51.6 db when the motor is actuated at a voltage of 11.8 to 12.0 V to open and close the door.

4. The clutchless power door opening device of claim 1, wherein a central portion of the ring gear fits in a central portion of the planetary carrier axially of the rotary shaft of the motor.

* * * * *